United States Patent [19]
Wilson et al.

[11] 3,940,097
[45] Feb. 24, 1976

[54] EXHAUST FLOW DEFLECTOR

[75] Inventors: John C. Wilson, Newport News, Va.; Craig S. Shaw, Middletown, Conn.

[73] Assignee: The United States Government as represented by the National Aeronautics and Space Administration Office of General Counsel-Code GP, Washington, D.C.

[22] Filed: June 25, 1974

[21] Appl. No.: 482,967

[52] U.S. Cl. ............................... 244/23 D; 60/316
[51] Int. Cl.² .......................................... B64D 33/04
[58] Field of Search ......... 244/17.11, 17.19, 42 CC, 244/53 R, 12 D, 23 D, 110 B, 130, 113, 52, 23 R, 23 A, 12 R, 12 A; 239/265.11, 265.19, 265.23; 181/39, 72, 33 HB, 33 HD; 60/316, 317

[56] References Cited
UNITED STATES PATENTS

| | | | |
|---|---|---|---|
| 897,586 | 9/1908 | Chatfield | 181/39 |
| 1,874,406 | 8/1932 | Wright | 181/72 |
| 2,749,064 | 6/1956 | Kuhlman | 244/130 |
| 2,921,435 | 1/1960 | Landgraf | 239/265.19 |
| 2,949,879 | 8/1960 | Kehn | 114/185 |
| 3,232,563 | 2/1966 | Langfelder | 244/42 CC |
| 3,327,482 | 6/1967 | Pike | 244/230 |
| 3,602,334 | 8/1971 | Goodman | 181/72 |

Primary Examiner—Trygve M. Blix
Assistant Examiner—Galen L. Barefoot
Attorney, Agent, or Firm—Howard J. Nelson; Howard J. Osborn; John R. Manning

[57] ABSTRACT

A deflector for reducing swirling flow spillover occurring when gas flowing through curved ducting attempts to exit into a freestream flow. When a gas flows through curved ducting it develops a swirling motion and when it attempts to exit into a freestream it is forced down over the sides of the duct by the strong freestream flow rushing past. The deflector is arcuately shaped and positioned upstream and adjacent the exit end of the curved ducting. As the freestream flow travels over the surface of the deflector, it is turned toward the direction of the flow from the exit of the ducting and draws the exiting flow along with it. The drawn exit flow is straightened and strengthened and is able to penetrate into the freestream flow. Further the ends of the deflector generate vortices which draw along the swirling flow at the sides of the exit end and straighten and strengthen it also. Thus the problem of swirling flow spillover of a gas exiting curved ducting into a freestream flow is substantially eliminated.

5 Claims, 5 Drawing Figures

EXHAUST FLOW DEFLECTOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to fluid flow and more particularly to the control of gases which exit curved ducts into a freestream gas flow.

When a gas flows through curved ducting, it develops a swirling flow pattern in the duct due to friction with the duct's walls. In the situation where this swirling flow exits into a freestream gas flow, it is unable to penetrate into the freestream flow and is, in effect, pushed down over the sides of the duct by the strong freestream flow. For the case of a helicopter in flight, for example, hot engine exhaust gases flow through curved ducting to exit into a freestream flow. These hot, swirling gases are unable to penetrate the freestream flow and are forced over the sides of the exhaust ducting and shielding and severely heat and discolor these elements causing serious maintenance problems.

Prior attempts at eliminating this hot gas spillover problem have focused mainly on devices such as vanes or collars installed internal of the exit of the curved duct to straighten the swirling exit flow so that it may penetrate the freestream flow. None of these attempts, however, have been successful in eliminating the spilling over of the hot swirling engine exhaust gases when they exit from curved ducting into a freestream flow.

Therefore, there is a definite need in the art for an apparatus and method which substantially eliminates the spillover problem of swirling gases exiting curved ducting into a freestream flow. There is also a definite need in the art for an apparatus and method for eliminating the heating and discoloring caused by helicopter engine exhaust gases spilling onto exhaust ducts and shields during flight of the helicopter.

Accordingly, the objects of the present invention are to provide an apparatus and method which eliminates the spillover problem caused by swirling gases which exit into a freestream flow and to provide an apparatus and method which eliminates heating and discoloring caused by hot engine exhaust gas spillover.

SUMMARY

The foregoing and other objects are attainable in the present invention by providing a curved deflector upstream and adjacent the exit of the curved duct. In the present embodiment, the deflector is designed and positioned so that the freestream flow travels over the deflector and is turned upwardly and directed toward the direction of flow of the gas exiting the curved duct and draws the swirling exhaust flow along with it. Since the swirling exhaust flow is drawn upwardly with the turned freestream flow, it is straightened and strengthened and can penetrate the freestream. Further, the end tip portions of the deflector generate upwardly spiraling vortices which pass over the outer sides of the exhaust duct exit. These vortices draw the swirling exhaust flow at the outer sides upwardly and straighten and strengthen it to penetrate the freestream.

BRIEF DESCRIPTION OF THE DRAWINGS

A more complete appreciation of the present invention and many more of the attendant advantages thereof will be more readily appreciated as the same becomes better understood by reference to the following detailed description when considered in connection with the accompanying drawings, wherein.

DETAILED DESCRIPTION OF THE INVENTION

Figure 1:
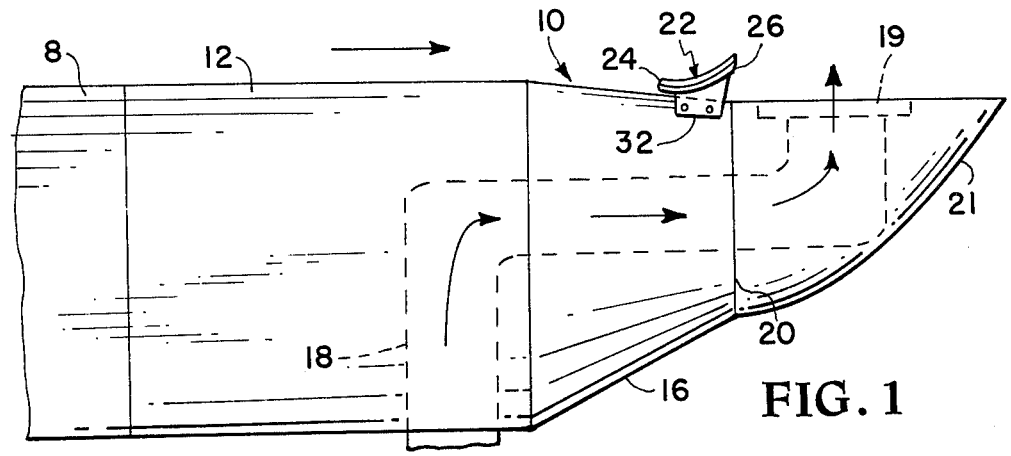
FIG. 1 is a schematic side view of a typical curved exhaust duct system showing the deflector of the present invention mounted on a helicopter.
Figure 2:
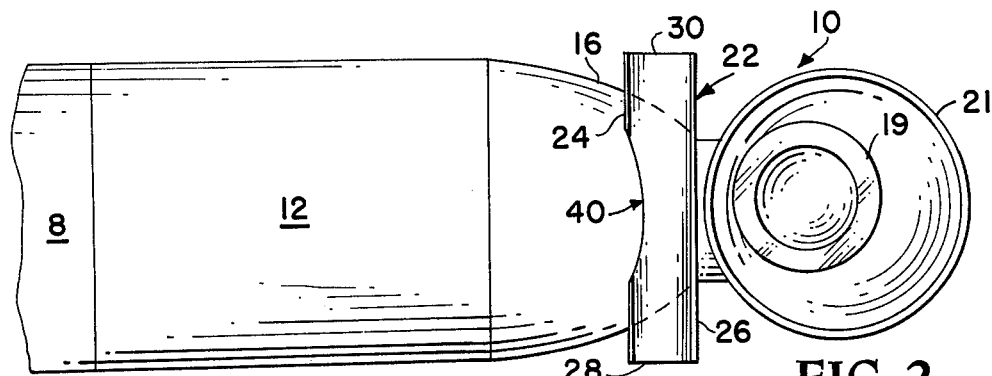
FIG. 2 is a top plan view of the exhaust-deflector system shown in FIG. 1.

Referring now to the drawings and more particularly to FIGS. 1 and 2, an exhaust duct system and housing for a helicopter 8 is shown and generally indicated by reference numeral 10.

The numeral 12 represents the exhaust duct housing for the embodiment of the present invention selected for illustration. A tapered cowling 16 is found at the downstream portion of housing 12. A curved exhaust duct 18 extends from an engine (not shown) within helicopter 8 through an exit aperture 20 formed in cowling 16. An exhaust shield 21 is mounted onto cowling 16 and is in communication with aperture 20. One end of duct 18 is in communication with the exhaust manifold of the engine and the other end 19 extends into exhaust shield 21. End 19 provides an exit for the engine exhaust gases, external to housing 12. The arrows shown in FIG. 1 denote the direction of flow of the gas flowing through and exiting exhaust duct 18.

A curved deflector 22 is mounted on cowling 16 adjacent end 19 and upstream of and substantially at the exit height of exit end 19 of curved duct 18.

Deflector 22 is generally rectangular in shape having sides 24 and 26 generally normal to the direction of travel of helicopter 8 and square end portions 28 and 30 generally parallel to the direction of travel of helicopter 8. Deflector 22 is formed with an upward arcuate curvature along the length thereof. The leading side 24 is substantially in line with the direction of the freestream flow and trailing side 26 is turned into the freestream flow in the direction of the exhaust gases exiting from exhaust exit 19. Deflector 22 has a radius of curvature of 8½ inches in the present embodiment. The span of deflector 22 along sides 24 and 26 in the present embodiment is generally equal to the diameter of exhaust shield 21 plus the chord length of deflector 22 itself. In the present embodiment shown for illustration, the span of deflector 22 is 30 inches and the chord length is 10 inches.

Deflector 22 is mounted onto cowling 16 adjacent exit end 19 and just upstream of exit end 19 of duct 18 and generally at the height of exit end 19. Mounting of deflector 22 is accomplished by two airfoil shaped bases 32 and 34 secured at one side each to the surface of cowling 16 and at another side to the underside of deflector 22. The sides of bases 32 and 34, in contact with the underside of deflector 22, are formed with a curvature therein corresponding to the curvature of deflector 22.

Figure 3:
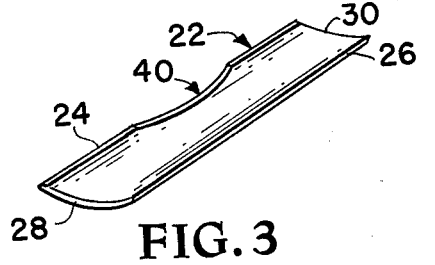
FIG. 3 is a perspective view of the deflector of the present invention.
Figure 4:
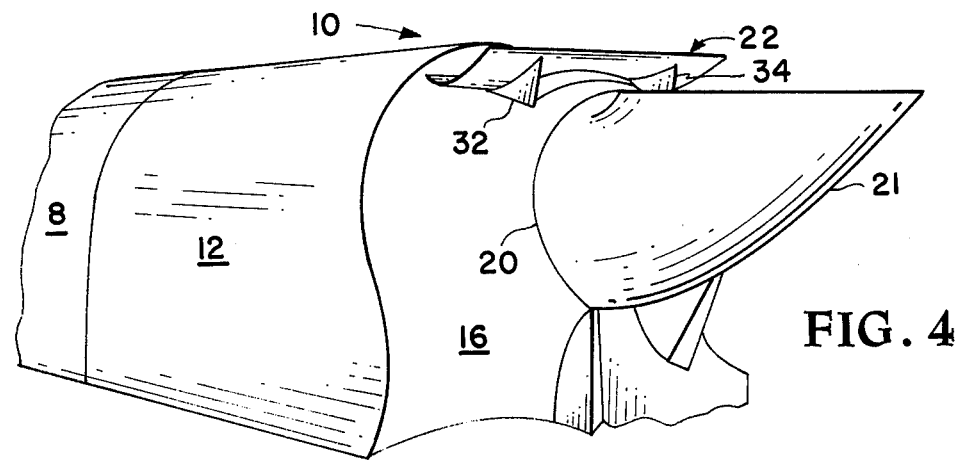
FIG. 4 is a perspective view of the exhaust system and housing shown in FIGS. 1 and 2.

An arcuate cutout 40 is formed in side 24 of deflector 22 and generally corresponds to the curvature of cowling 16 so that when bases 32 and 34 are positioned on the surface of cowling 16, side 24 of deflector 22 does not interfere with cowling 16. The overall configuration of deflector 22 and exhaust system 10 are more clearly illustrated in the perspective views of FIGS. 3 and 4.

Figure 5:
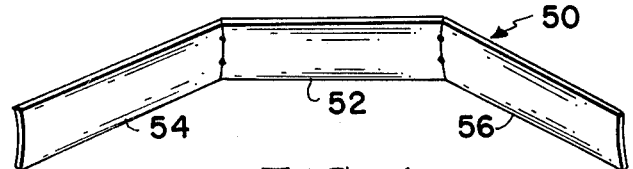
FIG. 5 is a perspective view of another embodiment of the deflector of the present invention.

Another embodiment of the deflector of the present invention is shown in FIG. 5 and is designated by reference numeral 50. Deflector 50 is formed of three rectangular shaped arcuate portions including a center portion 52 and two downwardly inclined end portions 54 and 56.

Center portion 52 of deflector 50 generally corresponds to deflector 22 in the previous embodiment illustrated; however, there is no cutout formed in any of the sides of center portion 52. Center portion 52 is a generally rectangular member having an arcuate curvature formed therein along the length thereof. End portions 54 and 56 are fastened one each onto the ends of center portion 52 of deflector 50 by conventional means such as rivets and are each inclined downwardly from the ends of center portion 52. End portions 54 and 56 are each generally rectangular elements having an arcuate curvature formed therein along the length thereof.

Deflector 50 is mounted onto cowling 16 in the same manner as deflector 22 and operates in the same manner as deflector 22.

OPERATION

When the exhaust gases travel through curved duct 18 from the engine to exit end 19, they develop a swirling flow pattern due to friction with the inner wall surfaces of duct 18. During flight of helicopter 8, these swirling exhaust gases attempt to penetrate and combine with the strong freestream flow rushing above exit end 19. Without deflector 22, however, the swirling exhaust gases are unable to penetrate into the freestream flow and are forced down over the sides of exhaust shield 21.

Generally, with the addition of deflector 22, the freestream patterns of the flow and the exhaust gas flow are altered such that the exhaust gases are able to penetrate the freestream air rushing above.

More specifically, with the addition of curved deflector 22, the oncoming freestream flow upstream to the swirling exhaust gases of duct 18 is turned from its direction of flow parallel to the direction of travel of helicopter 8 to a direction of flow in line of the gas exiting from exhaust end 19 of duct 18. As the freestream flow is turned just upstream of exit end 19 of duct 18, the swirling exhaust gases exiting the central portion of exhaust shield 21 are drawn along with the turned freestream flow. Since the swirling exhaust gases are drawn with the turned freestream flow, they are both straightened and strengthened and can now penetrate the air rushing above and are not forced over the sides of exhaust shield 21.

Further, each of squared end portions 28 and 30 of deflector 22 generate an upwardly spiralling vortex, the core of which passes over the outer side portions of exhaust shield 21.

Generally, as the spiralling vortices pass over the outer sides of exhaust shield 21 they draw up the swirling exhaust gases at the outer edges of exhaust shield 21. Since the swirling outer side exhaust gases are drawn along with the spiralling vortices, they are straightened and strengthened so that they can penetrate the air rushing above, and are not forced over the sides of exhaust shield 21.

Although the invention has been described relative to two specific embodiments thereof, it is not so limited and the specific example is for illustration of the principle only and is not intended to serve as a limitation thereof. Thus, many modifications and variations of the specific embodiments will be readily apparent to those skilled in the art in light of the above teachings. It is therefore to be understood that within the scope of the appended claims, the invention may be practiced otherwise than as specifically described therein.

What is claimed as new and desired to be secured by Letters Patent of the United States is:

1. In combination with a flight vehicle having an exhaust duct housing including a cowling and an exhaust shield through which extends a curved duct having an exhaust exit for exhausting engine gases into a freestream air flow, the improvement comprising a deflector positioned entirely upstream of and adjacent the exhaust exit;

said deflector being rigidly secured to the cowling and having a leading edge and a trailing edge and being substantially elongated in shape and having a span and a chord;

the span being at least equal to the diameter of the exhaust exit and alined substantially normal to the direction of travel of the freestream flow;

said deflector further being substantially rectangular and having chorduise a concave curvature surface formed therein along the span, the leading edge thereof being substantially in line with the direction of travel and in of the freestream air flow and the trailing edge thereof being turned into the freestream flow in the direction of flow of the gases exiting from the exhaust exit.

2. The combination of claim 1 further including means for rigidly securing said deflector to the cowling, said means comprising a pair of spaced base support members secured at one side to the surface of the cowling, said base support members being provided with a curvature on the side opposite to the side thereof secured to the cowling corresponding to the curvature of said deflector and secured to said deflector, said deflector being further provided with an arcuate cutout area corresponding to the curvature of the cowling intermediate the said base support members.

3. The combination as in claim 1 wherein the span of said deflector is equal to the diameter of the exhaust shield plus the chord of said deflector.

4. The combination as in claim 3 wherein said deflector is segmented and includes a center portion and two end portions, said end portions having square end tips.

5. Apparatus for reducing spillover inherent when aircraft hot engine gases flowing through a curved duct exits from the exhaust exit end of the curved duct into a freestream air flow, comprising an elongated deflector having square end tips mounted entirely upstream of and adjacent the exhaust exit end of the curved duct and having a span at least equal to the diameter of the exhaust exit end of the curved duct and having a concave curvature surface formed along the span thereof, the span of said deflector being alined substantially normal to the direction of flow of the freestream air and the concave curvature surface inclined such that the freestream air flow flowing over the concave curvature surface is turned toward the direction of flow of the gas exiting from the exhaust end of the exhaust duct.

* * * * *